United States Patent
McCoy et al.

(10) Patent No.: US 10,250,469 B2
(45) Date of Patent: Apr. 2, 2019

(54) METHOD AND APPARATUS FOR MONITORING ACTIVITY OF AN ELECTRONIC DEVICE

(71) Applicants: Sony Corporation, Tokyo (JP); Sony Interactive Entertainment LLC, San Mateo, CA (US)

(72) Inventors: Charles McCoy, Coronado, CA (US); True Xiong, San Diego, CA (US); Ling Jun Wong, Champaign, IL (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 22 days.

(21) Appl. No.: 15/420,368

(22) Filed: Jan. 31, 2017

(65) Prior Publication Data

US 2017/0141978 A1    May 18, 2017

Related U.S. Application Data

(62) Division of application No. 13/775,438, filed on Feb. 25, 2013, now Pat. No. 9,559,860.

(51) Int. Cl.
| | | |
|---|---|---|
| *H04L 12/26* | (2006.01) | |
| *H04L 12/28* | (2006.01) | |
| *H04L 29/08* | (2006.01) | |

(52) U.S. Cl.
CPC ........ *H04L 43/065* (2013.01); *H04L 12/2827* (2013.01); *H04L 43/045* (2013.01); *H04L 43/08* (2013.01); *H04L 67/22* (2013.01)

(58) Field of Classification Search
CPC .... H04N 7/181; H04N 5/232; H04L 63/0428; H04L 43/065; H04L 33/08; H04L 67/22; H04L 67/125; H04L 12/2803; Y02D 70/23; E05B 2047/0067; G01S 3/7864
See application file for complete search history.

(56) References Cited

U.S. PATENT DOCUMENTS

| | | |
|---|---|---|
| 6,406,426 B1 | 6/2002 | Reuss |
| 7,418,497 B2 | 8/2008 | Hagale |
| 7,664,853 B2 | 2/2010 | Hagale |
| 7,839,279 B2 | 11/2010 | Kahn |
| 8,229,535 B2 | 7/2012 | Mensinger |
| 8,315,506 B2 | 11/2012 | Goodman |

(Continued)

FOREIGN PATENT DOCUMENTS

CN    102695036    9/2012

OTHER PUBLICATIONS

Chinese Office Action dated Aug. 23, 2017.

*Primary Examiner* — Sargon N Nano
(74) *Attorney, Agent, or Firm* — Haug Partners LLP; William S. Frommer

(57) ABSTRACT

An apparatus and method for monitoring activity of a device. The method includes associating one or more monitoring devices with an electronic device. Rules that have been established to define acceptable content that can be accessed by the electronic device are accessed. Requested content, which is requested by the electronic device, is identified. The requested content is compared to the established rules. An alert condition is generated when the requested content violates the established rules. An alert signal is provided to the one or more monitoring devices based on the alert condition.

10 Claims, 9 Drawing Sheets

(56) References Cited

U.S. PATENT DOCUMENTS

| | | |
|---|---|---|
| 8,502,692 B2 | 8/2013 | Johnson |
| 9,407,710 B2* | 8/2016 | Li .................... H04N 21/44222 |
| 9,712,267 B2* | 7/2017 | Altman ................. H04H 60/04 |
| 2006/0064716 A1* | 3/2006 | Sull ................... G06F 17/30793 |
| | | 725/37 |
| 2007/0037605 A1 | 2/2007 | Logan |
| 2007/0061831 A1* | 3/2007 | Savoor ............... H04N 7/17318 |
| | | 725/13 |
| 2007/0204320 A1 | 8/2007 | Wu |
| 2007/0279494 A1* | 12/2007 | Aman .................. G01S 3/7864 |
| | | 348/169 |
| 2008/0092199 A1 | 4/2008 | McCarthy |
| 2008/0134249 A1* | 6/2008 | Yang ................. H04N 7/17318 |
| | | 725/46 |
| 2008/0222106 A1* | 9/2008 | Rao .................. G06F 17/30696 |
| 2010/0064316 A1 | 3/2010 | Dai |
| 2010/0146607 A1* | 6/2010 | Piepenbrink ........ G06F 21/6218 |
| | | 726/7 |
| 2010/0222645 A1 | 9/2010 | Nadler |
| 2011/0007648 A1* | 1/2011 | Liu .................... H04L 41/5003 |
| | | 370/252 |
| 2011/0028333 A1 | 2/2011 | Christensen et al. |
| 2011/0103770 A1* | 5/2011 | Goodman ............... H04N 7/141 |
| | | 386/255 |
| 2011/0131600 A1 | 6/2011 | Howcroft |
| 2011/0283311 A1 | 11/2011 | Luong |
| 2012/0069131 A1 | 3/2012 | Abelow |
| 2012/0083705 A1* | 4/2012 | Yuen .................... A61B 5/0002 |
| | | 600/508 |
| 2012/0089699 A1 | 4/2012 | Cholas |
| 2012/0242775 A1 | 9/2012 | Lin |
| 2013/0279744 A1 | 10/2013 | Ingrassia, Jr. |

\* cited by examiner

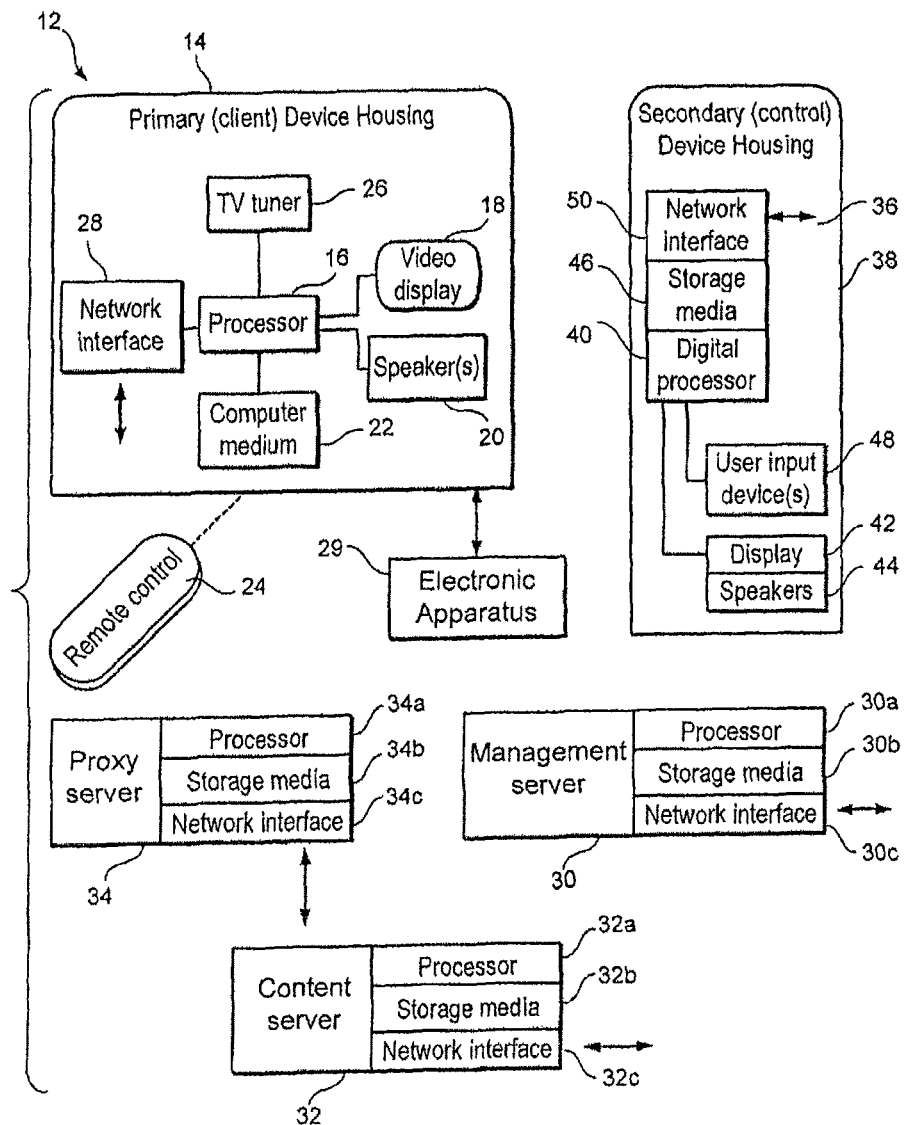
F I G. 1

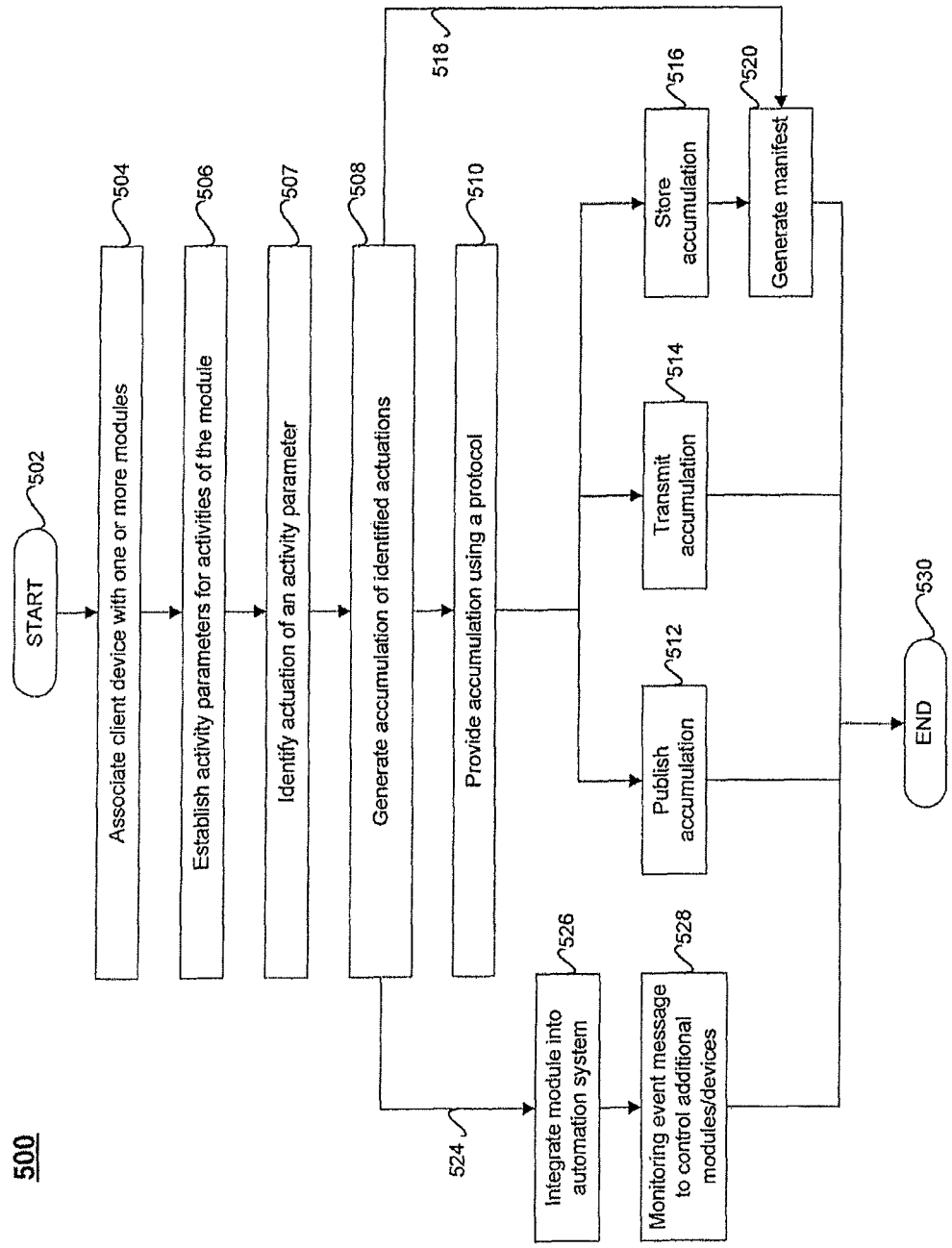

METHOD AND APPARATUS FOR MONITORING ACTIVITY OF AN ELECTRONIC DEVICE

This is a divisional of application Ser. No. 13/775,438, filed Feb. 25, 2013, the entirety of which is incorporated herein by reference.

BACKGROUND

1. Field of the Invention

This invention relates generally to monitoring activity on a consumer electronic device from an external device over a network. More particularly, the present invention relates to establishing a monitoring device in the consumer electronics device's settings as a registered listener, which causes the consumer electronics device to send information to the registered monitoring device over a predefined protocol.

2. Background Discussion

Typically, consumer electronic devices do not permit remote monitoring by a monitoring device. As will be described in more detail herein, Internet access through TVs is typically provided by essentially programming the TV (often referred to as an Internet Protocol TV, or IPTV) as though it were a computer executing a browser. While IPTV enabled devices may be able to send tracking information about content being played, there are additional functions that would be useful.

SUMMARY

The present invention allows users to register event listeners (monitoring devices) with their consumer electronics devices, which will then cause the consumer electronics devices to send event notifications to the registered listeners (monitoring devices). The listening device may do any number of things with the information that it receives, such as logging the information. Indeed, the consumer electronics device may configure more than one listener. In such a case, separate messages are sent to each listener for each event being listened for. Furthermore, the consumer electronics device may present the user with options as to what types of information each registered listener will be sent by the consumer electronics device.

Accordingly, one embodiment of the present invention is directed to a method and system for monitoring a consumer electronics device by one or more registered listening (monitoring) devices.

Another embodiment is directed to an apparatus and method for monitoring activity of a device. The method includes associating one or more monitoring devices with an electronic device. Rules that have been established to define acceptable content that can be accessed by the electronic device are accessed. Requested content, which is requested by the electronic device, is identified. The requested content is compared to the established rules. An alert condition is generated when the requested content violates the established rules. An alert signal is provided to the one or more monitoring devices based on the alert condition.

As one example, as content requests are accumulated, advertisement content is generated based on such accumulation, and transmitted to selected electronic devices.

As another example, setting control data is established for a particular electronic device; and settings of another electronic device are modified based on the setting control data. For example, the settings of the other control device are modified proportionally based on the setting control data.

Yet another embodiment is directed to a monitoring method and apparatus in which an electronic device is associated with one or more activity modules. The actuation of the activity parameters of the activity module are identified and accumulated; with the accumulation of identified actuations following a pre-selected protocol.

As one example, the accumulation of identified actuations is logged, based on code module, event or priority. For example, an event is logged for a period of time, based on the code module, event or priority.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 1 shows a block diagram of an IPTV system.

FIG. 5 shows an embodiment of the present invention that monitors activity of a module of an electronic device.

DETAILED DESCRIPTION

Figure 2A:
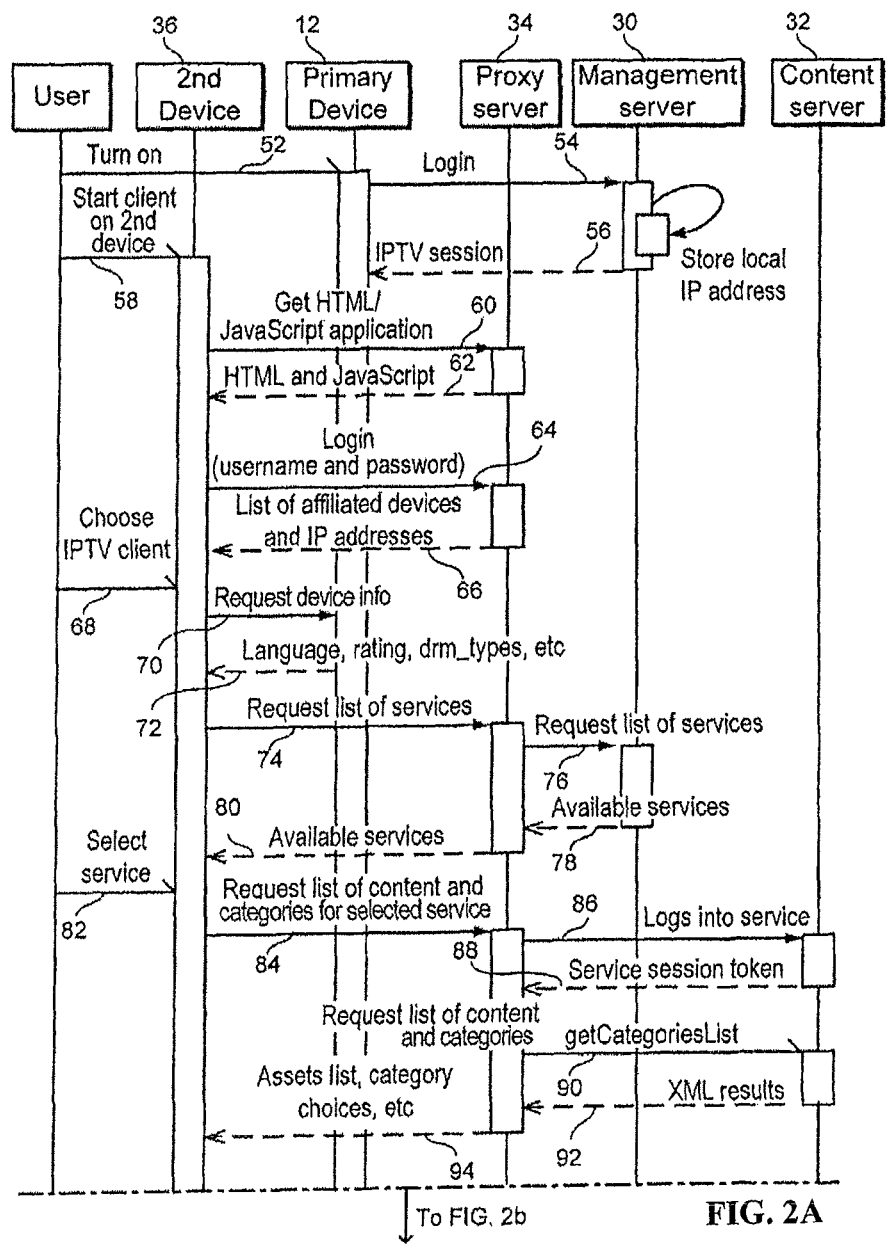
FIGS. 2A and 2B show a series of steps according to the IPTV system.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, or processing modules, or processing facilities. The processing devices, or modules, or facilities, may be coupled such that portions of the processing and/or data manipulation may be performed at one or more processing devices and shared or transmitted between a plurality of processing devices.

An IPTV (Internet Protocol Television) device may be used to control home appliances through IPTV as well as monitor content provided to an electronic device. These home appliances include, for example, televisions, audio players, video players, game players, home theater systems, digital video recorders, air conditioners, and etc. Household electrical appliances and audio-visual apparatuses, such as video cassette recorders (VCRs), televisions, air conditioners, and lighting apparatuses, may be furnished with remote controls. These remote controls each have operation units and functions specific to each apparatus. In order to control home appliances, a dedicated remote control may be placed in a vicinity of an associated home appliance. IPTV provides the ability to integrate different functions or different applications into a single control device to control multiple appliances. This single control device may be a smart phone, a digital personal assistant, a personal computer, lap top computer, tablet, or other device with adequate processing and/or storage capabilities. The single control device may transmit control signals through a public network or Internet or other network of operatively coupled computers, or processing devices or modules to an IPTV device, which uses the control command to control home appliances.

An IPTV device can access a vast pool of content provided by numerous content providers. The IPTV device may also be used to control further distribution of content that has been provided by a third party to the IPTV device so that unauthorized access is prevented. Typically, IPTV is controlled by a single input device and has a single display device.

Accordingly, a method is provided to enable a user to monitor and manipulate (e.g., browsing, searching, displaying, pausing, playback, or other operation) on a second device, to have their selection played by a first device. The user can then continue to browse the content on any number of second devices without interrupting the content that is playing on the first device. The first device may be an IPTV. The second device may be another electronic device. The method include an architecture design and implementation that allows a user to navigate, browse, and search content on a second device that may be a consumer electronic device such as a Sony Ericsson® smart phone, VAIO® PC, VAIO® laptop, Mylo®, personal computer, or other apparatus with sufficient processing and storage capability, or any device with a web browser. Concurrently, while a user is using the first device, another user can perform these activities on the second device and send a media selection to the first device of the another user's choice for playback A second device, also referred to as a secondary device and/or a secondary display device, herein, performs manipulating functions such as searching, content playback, browsing (when operable with a web browsing application) and may act as a visual aid to the IPTV device, but does not require additional investments by the user because it makes use of a device (such as a cellphone, laptop, etc) which most users would typically already have in their possession. The second device executes a program that allows the second device to act as the visual aid. It is a low cost solution which opens up a huge window of business and technical opportunities for use with one or more IPTV devices. It is a favorable complement to the IPTV because the secondary device has strengths in data entry, processing power and user experience in content management. Thus, users will be able to use their personal devices, such as a cellphone, to perform manipulations, such as, for example, browse content in their own language, perform data entry, search for content, manage their content, perform transactions and personalize their experience without disturbing the big screen of a first device. Users only send the content for playback on the IPTV device when they are ready to watch it; and playback of proprietary content does not occur on the non-authentic device so security risks are minimized. The program may be written in any suitable language with desired functionality, such as, for example, JavaScript™ or HTML, or other language with the desired functionality, which can be loaded by any device with a browser or an application written in languages which may not be run in a web browser, such as C, C++, Java, etc., hence not limited to only a small set of compatible devices.

An IPTV system typically includes an IPTV client device that includes a display and a processor, for controlling a video display of content on the IPTV client device. The system also includes a second device (also referred to as a secondary device and/or a secondary display device, which may or may not have a display unit) including a control processor and a management server communicating with the IPTV client device over the Internet. The management server and IPTV client device communicate with at least one content server such that the content server provides audio video content to the IPTV client device for presentation of the content on the video display of the IPTV client device. The system further includes a proxy server communicating with the management server and the second device. Alternatively, the proxy server may return an executable utility to the second device. Yet another embodiment provides that the second device will communicate to the IPTV client device through an external server. The IPTV client sends login information to the management server which returns to the IPTV client an IPTV session token that is subsequently presented by the IPTV client device to a the content server to obtain content from the content server. The management server receives and stores a local IP address of the IPTV client device or an external IP address of the IPTV client device, which may include, for example Uniform Resource Indicator (URI) or Uniform Resource Locator (URL) or a network location or network address. The management server can also store an external IP address, which allows communication from a secondary device, which is outside the network, to the IPTV device. Responsive to the second device sending a request to the proxy server for an executable utility, the proxy server returns the utility to the second device. Further, the second device, executing the utility, prompts a user to input to the second device login information. The proxy server, responsive to reception of correct login information from the second device, returns the local IP address of the IPTV client to the second device. The second device uses the local IPTV address to access the IPTV client directly to request information about the IPTV client, which information is returned from the IPTV client to the second device such that the local address of the IPTV client need not be globally addressable. Also the second device sends the information about the IPTV client to the proxy server, requesting a list of services available to the IPTV client from one or more content servers. The proxy server relays the request for a list of services to the management server, which returns the list to the proxy server, with the proxy server in turn sending the list to the second device for presentation of information on the video display. Responsive to a user selection of an element on the list, the second device sends a request for a software asset corresponding to the element to the proxy server. The proxy server requests a service login of the content server providing the asset, and the content server provides to the proxy server a list of assets or categories or services which relays the list to the second device, which is presented on the video display of the second device so that the user can navigate to enter a selection. Responsive to the selection the second device sends a command to the IPTV client to play the selection.

The IPTV client requests, of the management server, information about the selection received from the second device. The information is returned from the management server to the IPTV client to enable the IPTV client to play content associated therewith. If desired, the proxy server can request of the content server a list of options, and the list is returned to the proxy server. Asset information may be requested by the IPTV client and returned thereto by the content server. Also, a request to log into service, received from the second device, may be sent by the IPTV client to the content server and a service session token returned to the IPTV client in response. When a list of contents is sent to the second device, URL of contents may be removed from the list. The second device requests a content using a unique identifier of the content, the proxy server or the management server may use the unique identifier of the content to locate a corresponding URL of the content. In this way, the second device may not obtain the URL of content so that unauthorized distributions of content are effectively prevented.

A consumer electronic device (CE) may act as a second device, which includes a housing holding a display, a network interface, and a processor controlling the display and communicating with the Internet through the network interface. An input device communicates with the processor. The processor executing logic includes sending login information to a proxy server, and receiving from the proxy server, responsive to reception thereby of correct login information, a local IP address of an IPTV client device. The processor uses the local IPTV address to access the IPTV client directly to request information about the IPTV client, sending the information about the IPTV client to the proxy server. Responsive to sending the information about the IPTV client to the proxy server, the processor receives content information, presenting it on the display from which a user can select a selected content. The processor commands the IPTV client to play the selected content.

A proxy server assembly includes at least one processor and at least one network interface communicating with the processor to establish communication between the processor and a wide area network.

At least one computer readable storage medium is accessible to the processor of the proxy server and has logic causing the processor to receive login information from a second device. Responsive to a determination that the login information is correct, the proxy server sends to the second device a local IP address of an IPTV client associated with the login information. The proxy server receives from the second device information about the IPTV client requesting a list of services available to the IPTV client from at least one content server and sends a request for the list of services to a management server. The proxy server receives from the management server the list and sends it to the second device for presentation of information on a video display thereof. The proxy server then receives from the second device a request for a software asset and responsive to the request for the software asset, requests to log into service of the content server. The proxy server receives back from the content server a list of assets or categories or services and sends the list to the second device. In this way, the list can be presented on a video display of the second device so that a user can navigate to enter a selection to command the IPTV client to play the selection.

A first device is connected with a plurality of electronic devices. A second device may transmit control commands to the first device using a communication network or internet to control the plurality of electronic devices.

Referring to FIG. 1, an IPTV system may include a first device such as a client consumer electronics device 12, a second device such as another consumer electronics device 38, an electronic device 29 connected with the first device, a management server 30, a proxy server 34, and a content server 32. Each of the above devices and servers may have both a wired communication interface and a wireless communication interface. These wired and/or wireless communication interfaces are shown in FIG. 1 as bidirectional arrows.

The client consumer electronics device (CE), or electronic device 12, as a first display device, such as a TV, game player, video disk player, camera, digital clock radio, mobile telephone, personal digital assistant, laptop computer, audio player, BLU-RAY™ etc. includes a portable lightweight plastic housing 14 bearing a digital processor 16. The processor 16 can control a visual display 18 and an audible display 20 such as one or more speakers. The client consumer electronics device 12 has a unique identifier that, without other means, is able to identify the client consumer electronics device 12 within the IPTV system. The unique identifier may be assigned by a manufacturer or assigned by the management server when the client consumer electronics device 12 is registered in the IPTV system.

The processor 16 may access one or more computer readable storage media 22 such as but not limited to RAM-based storage (e.g., a chip implementing dynamic random access memory (DRAM) or flash memory or disk-based-storage. Software code implementing present logic executable by the CE device 12 may also be stored on one of the memories.

The processor 16 can receive user input signals from various input devices including a remote control device 24, a point and click device such as a mouse, a keypad, etc. A TV tuner 26 may be provided in some implementations particularly when the CE device is embodied by a TV to receive TV signals from a source such as a set-top box, satellite receiver, cable head end, terrestrial TV signal antenna, etc. Signals from the tuner 26 are sent to the processor 16 for presentation on the display 18 and speakers 20.

As shown in FIG. 1, a network interface 28 such as a wired or wireless modem or wireless telephony transceiver communicates with the processor 16 to provide connectivity to a wide area network such as the Internet. Double arrows in FIG. 1 indicate network communication between components over wired and/or wireless links. In this way, the client device 12 can communicate with a management server 30 on the Internet and with one or more content servers 32, also on the Internet and communicating with the management server 30.

If desired, each content server 32 may be associated with a respective proxy server 34 which interfaces the content server 32 with the device 12. The servers 30, 32, 34 have respective processors 30a, 32a, 34a accessing respective nontransitory computer readable storage media 30b, 32b, 34b which may be, without limitation, disk-based and/or solid state storage. The servers communicate with a wide area network such as the Internet via respective network interfaces 30c, 32c, and 34c. It is to be understood in view of disclosure below that the CE device 12 particularly when implemented by a non-PC device such as a TV or game console or camera can communicate only with the management server 30 and with content servers 32 that appear on a service list provided to the processor 16 by the management server 30, with the service list not being modifiable by the processor 16.

The electronic device 29 is connected with the first device 12 using a cable such as a 1394 cable or a HDMI cable or using a wireless communication interface such as infrared signals. The electronic device 29 may be a digital video recorder, a BLU-RAY™ player, a game player, an audio amplifier, an air conditioner or any controllable apparatus. Storage may be any suitable electronic storage, such as RAM, ROM, EEPROM, or other storage medium, or cloud-based storage using local or remote storage via a network, such as storage at a remote server.

A second device 36, as a control device or a second display device, may be another consumer electronics device. The second device 36 may be another TV, game player, video disk player, camera, digital clock radio, mobile telephone, personal digital assistant, laptop computer, etc. The second device 36 with a housing 38 has a digital processor 40 controlling a visual display 42 and an audible display 44 such as one or more speakers. The second or control processor 40 may access one or more computer readable storage media 46 such as but not limited to RAM-based storage (e.g., a chip implementing dynamic random access memory (DRAM) or flash memory or disk-based-storage. Software code implementing present logic executable by the second or control device 36 may also be stored on one of the memories shown. Further, the second or control processor 40 can receive user input signals from various input devices 48 including a point and click device such as a mouse, a keypad, etc. A network interface 50 such as a wired or wireless modem or wireless telephony transceiver communicates with the processor 40 to provide connectivity to a wide area network such as the Internet.

Figure 2B:
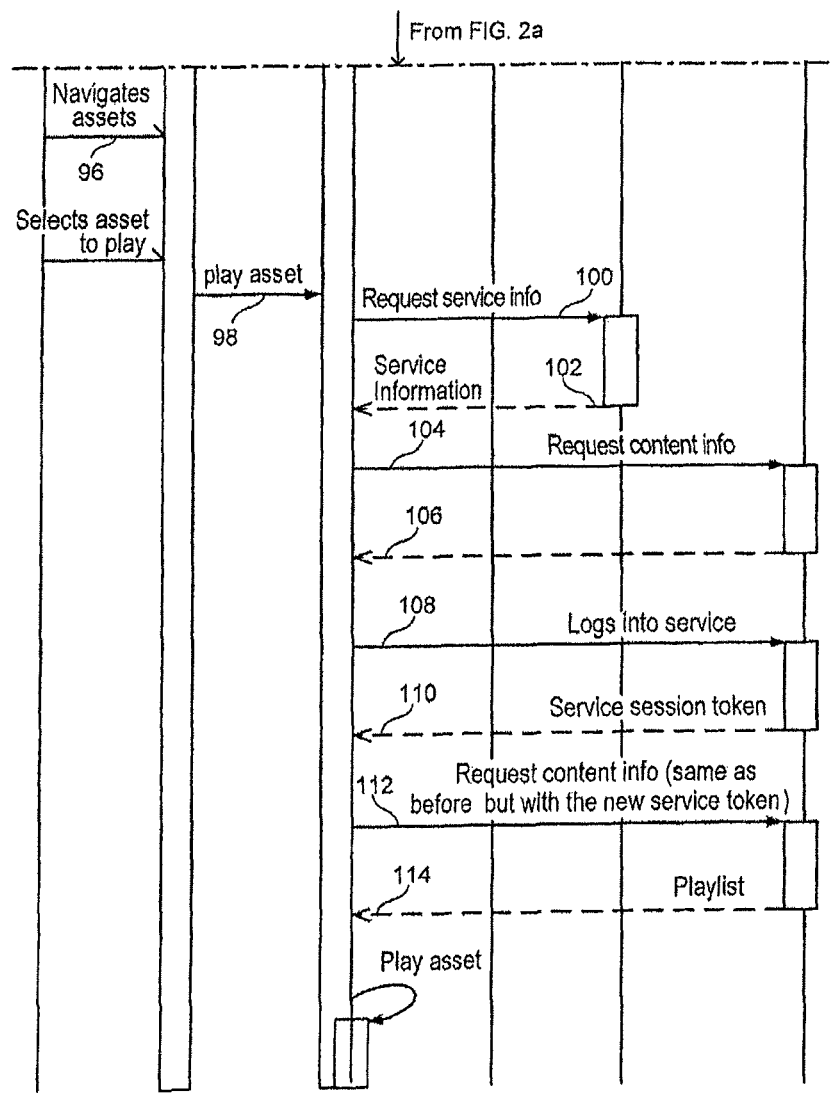

FIG. 2 shows an example for enabling a user to use a second device 36 to browse assets and select one asset to have a first device 12 such as a main IPTV client play the content (the IPTV client is also referred to as an IPTV client device and/or an IPTV device and/or IPTV herein). FIG. 2 assumes that the user has already created an account with the management server 30 and has affiliated the main IPTV device with that account. In general, a user loads the web application in the second device and logs into their user account, which may be the same account used for device registration. Once logged in, a list of compatible IPTV devices is presented. After the user selects one of the IPTV devices, a list of services that the device is entitled to is provided to the user. The user browses the services and their content, in his/her preferred language, on the second device as though it is an actual IPTV device such as the first device. Similar transactions, like video rentals or home shopping purchases, can also be made on the second device. Standard IPTV system interaction with service providers occurs on the proxy server, hence creating a firewall between the second device and content providers. Additional navigation features, like hyper-linked text which will open a new window and the management of premium services from a single location, provide better user experience in this IPTV system.

When a piece of content is selected, it may be sent to the IPTV for command execution (i.e., playback) in the form of a reference id which is used by the IPTV to retrieve content information. By eliminating the presence of the content URL on the second device, the risk of leaking major proprietary information which could result in huge losses is reduced. During the time of playback, the user can continue to browse for other content and queue it for future playback. The IPTV needs to be addressable by the second device to perform playback, which is the case when both devices are on the same local network. The user can also switch devices and resume playback on a different device such as the electronic device 19 in FIG. 1 by going to the recently viewed list and selecting the last video played after switching control to that device.

A detailed description of each state in FIG. 2 is provided as follows.

At state 52 a user turns on the first device 12, hereafter referred to as the "IPTV client" for convenience. At state 54 the IPTV client sends login information including, e.g., user name and password to the management server 30, which at state 56 returns to the IPTV client an IPTV session token that may subsequently be presented by the IPTV client device to a participating content server 32 to obtain content from that server. Also, the management server 30 stores the local location (IP address or IP address and port number) of the IPTV client 12.

At state 58, the user instantiates an IPTV client control utility on the second device 36. The utility executed on the second device 36, at state 60, sends a request to the proxy server 34, which returns (62) hypertext markup language (HTML) with JavaScript™ for the second device 36 to execute in accordance with description below. This JavaScript™ makes asynchronous JavaScript™ and extended markup language (XML) (AJAX) calls or other formats in other implementations, to the proxy server and to the IPTV client to obtain information to control the IPTV client. It is noted that state 60 is only needed in implementations that use a downloadable HTML application for the second display software. The behavior of the JavaScript™ applies to implementations that are built using JavaScript™. In another embodiment, step 60 may not be necessary where other client application implementations are used, such as one where the client application is not downloaded each time it is used. It should also be noted that other technologies (e.g. C, C++, Perl, and Flash) can be used for the implementation of the client application and that neither HTML nor JavaScript™ are required.

With more specificity, at state 64 using the JavaScript™ received from the proxy server 34 the second device 36 prompts the user to input to the second device 36 the account login information, including, e.g., the same user name and password that the IPTV client device provided to the management server 30 at 54. Thus, the servers 30, 32, 34 communicate necessary account information between them as needed to realize present principles.

At state 66 the proxy server 34, responsive to a correct user name and password from the second device 36, returns information about all IPTV clients 12 that are affiliated with the user account associated with the user name and password, including their local IP addresses which were stored by the management server 30 after login at 54 (and subsequently provided to the proxy server 34).

When the user inputs to the second device 36 at state 68 a selected IPTV client (in this example, the IPTV client 12) to use with the second device, the second device 36, using the local IP address returned at state 66, accesses the IPTV client 12 directly. The second device 36 requests device information about the IPTV client device 12 at state 70, including language information, rating information, digital rights management (DRM) information, etc. as desired, which information is returned from the IPTV client 12 to the second device 36 at state 72. Since the second device 36 knows the IP address of the IPTV client 12 and consequently communicates directly with the IPTV client 12, the second device 36 communicates using a local web address of the IPTV client 12 that need not be globally addressable, and may so communicate as long as the second device 36 and IPTV client 12 are on the same local network. It is noted that in state 70, the communication from the second device to the primary device may go through an external server in some implementations, which will allow the system to operate in environments where the primary device is not reachable by the second device due to the network configuration.

At state 74 the second device 36 sends the client information received at state 72 to the proxy server 34, requesting a list of services available to the IPTV client device 12 from one or more of the content servers 32. The proxy server 34 relays the request for a list of services at state 76 to the management server 30, which returns the requested service list at state 78 to the proxy server 34. The proxy server 34 in turn sends the services list to the second device 36 at state 80 for presentation of available services on, e.g., the second device display 42.

State 82 indicates that a user can input (using, e.g., the second device input device 48) a selection of a service on the list that was returned to the second device at state 80. In response, the second device 36, at state 84, sends a request for a list of content and categories to the proxy server 34 along with a service session token that the second device may have received from the content server 32 via the management server 30.

Responsive to the request, at state 86 the proxy server logs into the content server 32 providing the selected service. At state 88 the content server 32 provides to the proxy server 34 a service session token for the particular content server 34. State 90 indicates that, if desired, the proxy server 34 may also request a list of content and categories of the content server 32, and the list is returned at state 92 in, e.g., extended markup language (XML), JSON, or other language formatted to the proxy server 34, which relays the assets, categories, services, etc. available for selection to the second device 36 at state 94. When the list of assets or the list of options is provided to the second device, the URL associated with each asset or options are removed. A reference ID is added to the list for each asset and options. The second device requests a particular asset or option by using the reference ID. In this way, the second device may not obtain any URL of the assets or options.

The content available for selection is presented on the second device display 42 so that the user can navigate (96) the display to enter (98) a selection. Responsive to the selection the second device 36 at state 98 sends a command to the IPTV client 12 to play the selection. At state 100 the IPTV client 12 then requests service information of the management server 30 information about the service the selected asset is in, logging in to the service if required. The requested information is returned from the management server 30 to the IPTV client 12 at state 102, and when the IPTV client 12 receives the asset information it plays the asset at state 116. Note that if the IPTV client is already playing content, the new content commanded to be played by the second device is placed in a queue in the IPTV client and played when the current content completes. Alternatively, the IPTV client 12 can cause an interrupt in the currently playing content by terminating the current content and playing the requested content immediately.

Note further that the second device may command the IPTV client to play content by sending to the IPTV client over the home network commands coded as if they were sent from an infrared remote control (IR RC), specifically for example the commands may be in Sony® Infrared Remote Control System® (SIRCS) protocol. The second device may transmit command signals to the IPTV client to control the electronic device 29.

As shown in FIG. 2, if desired, temporally between states 102 and 106 a series of messages may be exchanged between the IPTV client 12 and the content server 32. For example, a request for content information may be made (104) by the IPTV client 12 and returned (106) by the content server 32. The above-described logging into the service may be relayed by the IPTV client 12 to the content server 32 at state 108 and a service session token returned to the IPTV client at state 110 along with the before-mentioned asset information. Also, a request for content information may be made (112) and a playlist returned to (114) the IPTV client device 12.

The software, such as JavaScript™/HTML software, that is downloaded at state 62 can be make available to all electronic vendors who wish their users to be able to manipulate, such as, navigate, browse, and search IPTV content on a second device.

Figure 3:
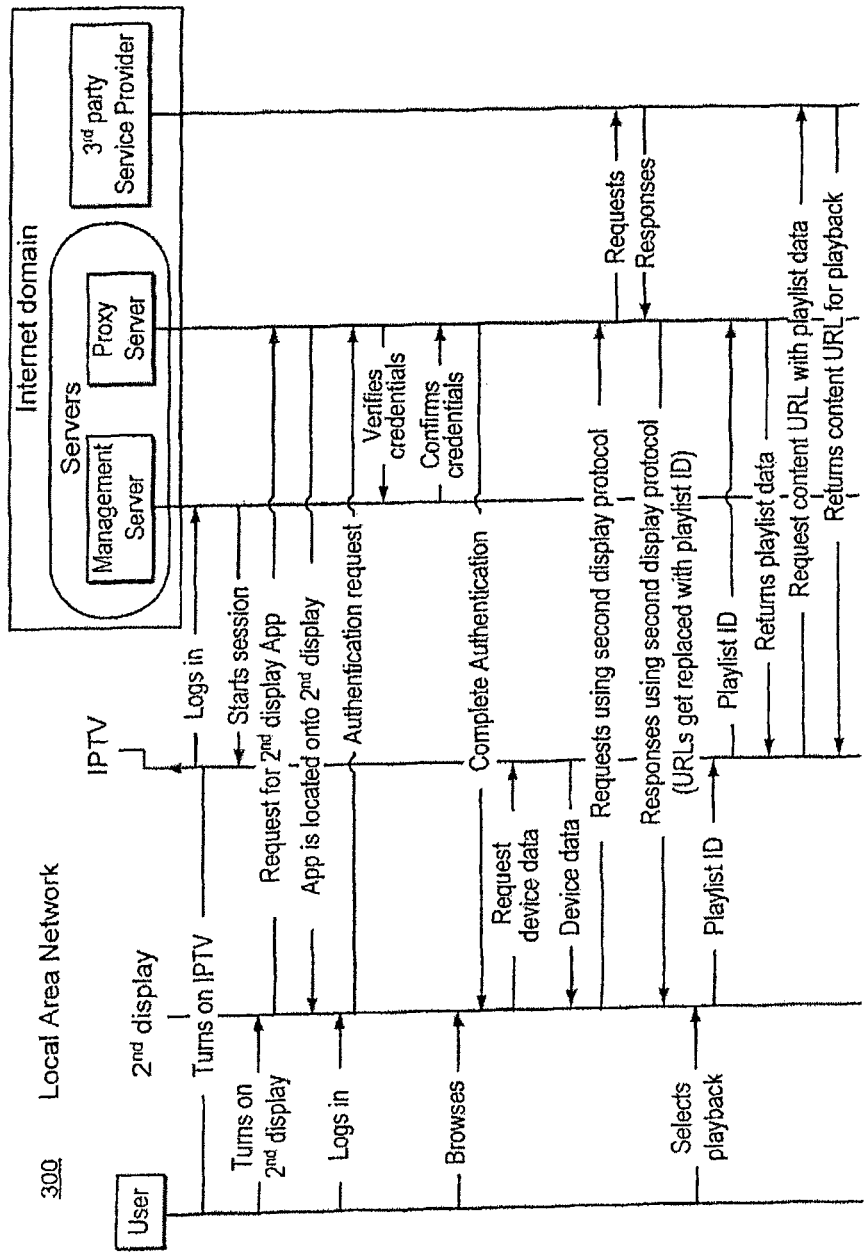
FIG. 3 shows a schematic representation of an application of the IPTV system.

FIG. 3 shows a schematic representation 300 in which the IPTV system finds ready application. First a user turns on an IPTV client. After the user logs in on the IPTV client into the manager server using the device credential, a session is started. Then the user turns on the second display device, and requests for a second display application to a proxy server (this can be a remote or local server). The application (native/interpreted application) is loaded onto the second display device. Then the user logs into the application using account information, the account is the same account used for the IPTV client to log in as described above (however, this is not the same account credential). An authentication request is sent from the second display device to the proxy server. The proxy server verifies credentials with the management server, and then the management server confirms credentials with the proxy server. Thus, authentication is completed.

Then the user browses an Internet video link (IVL). After that, the device data is requested from the second display device and then the requested device data is sent from IPTV client to the second display device. The second display device sends a request using second display protocol to the proxy server, and then the proxy server requests to service provider, and the service provider responds. The proxy server responds using a second display protocol to the second display device with the associated URL replaced with a playlist ID.

After the user selects playback, the playlist ID is sent from the second display to the IPTV client. Then the playlist ID is sent from the IPTV client to the proxy server, and playlist data is returned from the proxy server to the IPTV client. The IPTV client requests a content URL with playlist data of the service provider, and then the service provider returns the content URL for playback to the IPTV client. When the IPTV client device is not reachable, the playlist ID is not received and the second display device notifies the user that the IPTV client device is not reachable. The second display device stores the Playlist ID for a later attempt at sending to the IPTV client. In another embodiment, the second display device may inform a server of the playlist ID and when the IPTV device is connected to the server, may receive the request even when the IPTV device and the second display device are on separate local networks and cannot address each other. In this case, the IPTV device may still not be reachable, as in a case where the IPTV device may not be connected to a power supply, and the request is queued at the server to be sent at a later time when the IPTV device is reachable.

Figure 4A:
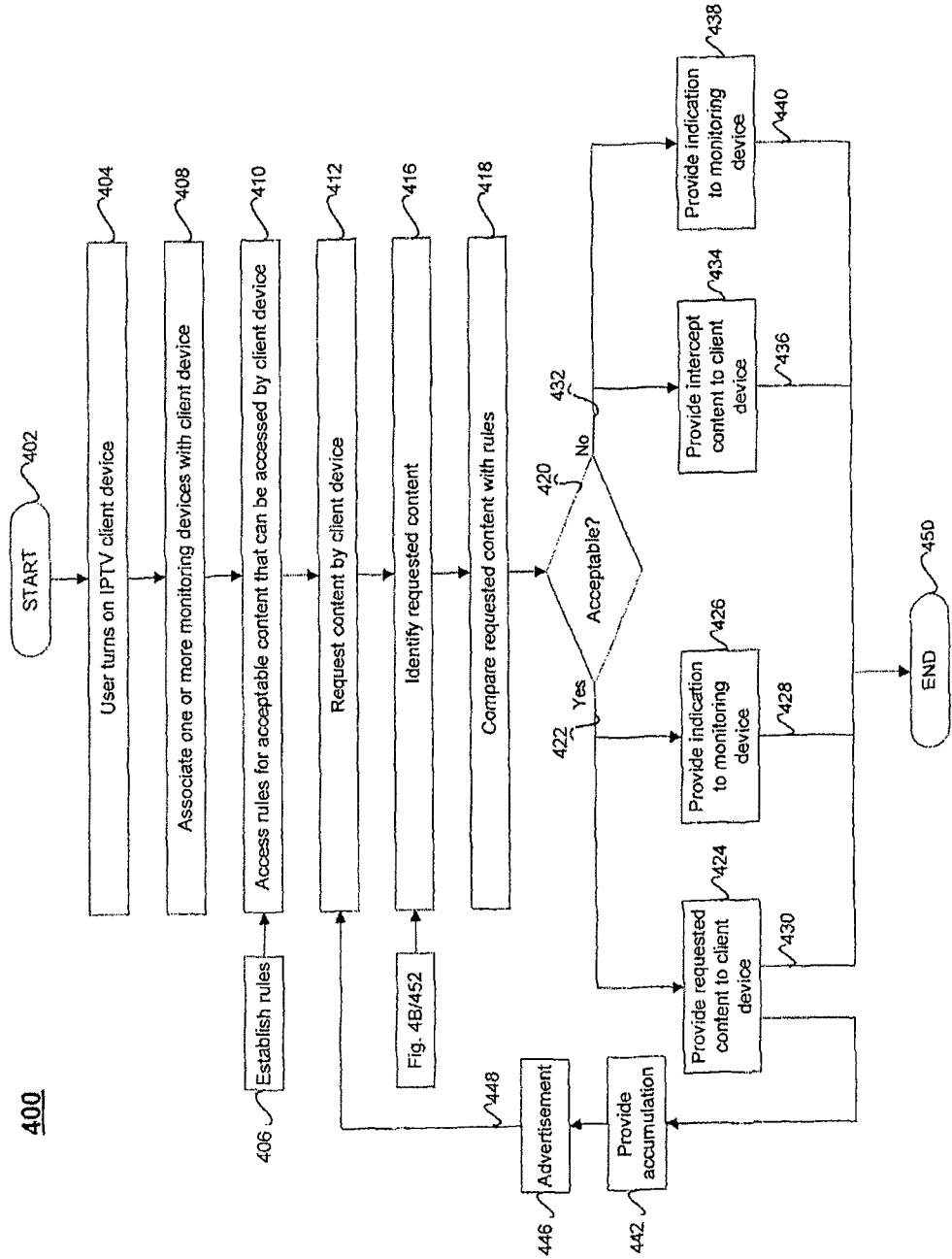
FIGS. 4A and 4B are flowcharts of an embodiment of the present invention in which a monitoring device monitors content requested by an electronic device.

FIG. 4A shows a flow chart 400 of processing steps according to an embodiment of the present invention. In one embodiment of the present invention, consumer electronics devices, or IPTV devices, or client devices send notifications over a network connection to allow monitoring and/or logging activity of the client device by a monitoring device. The steps may be stored on a suitable electronic storage medium, such as a non-transitory computer-readable storage medium, for example, ROM, RAM, and EEPROM. The storage medium may be resident on the device (local) or accessed from a remote device (remote). The steps 400 are typically executed by a processor having adequate speed and processing capabilities. The execution may be at the client device and/or an associated server device.

The process begins in step 402. Step 404 shows that the user turns on IPTV client device, or electronic device. The IPTV client device, or electronic device, is used to display content such as video content, webpages, audio content, pixel data, and any information that can be represented in electronic form. Typically, the IPTV client device is registered with the management server, or authenticated with the management server, as described herein. In step 408, one or more monitoring devices, or listening devices, are associated with a particular IPTV client device. These monitoring devices, or listening devices, are typically IPTV devices that are operatively coupled to the client device such that the monitoring device(s) can share information with the client device. Typically, a user enters the URL (Uniform Resource Locator) of the device they wish to register as an event listener, or monitoring device. These monitoring devices are able to monitor content that is requested by the associated IPTV client device. This monitoring may be, for example, children's television viewing or music content children are downloading from a source via the Internet. The monitoring may also include consumer electronics devices sending detailed information about its activity to a server used by a customer service agent. This detailed information may include diagnostics application being run on an external device by the user's device.

In step 406, rules are established for the associated IPTV client device. These rules are parameters for content that may be accessed by the client device. For example, if the client device is not permitted to access content that is rated "PG-13" or higher (i.e., "R") that content is outside the established rule and is not permitted to be accessed by the IPTV client device. The established rules can be associated with a device and/or a user account for a device. Thus, different users who have access to the same client device may have different rules. The rules established, as shown in step 406, are provided, as shown in step 410, to determine whether content may be accessed by a user of a client device.

As shown in step 412, a user, at a client device, can request content. The requested content is identified, as shown in step 416. Line 452 shows that FIG. 4B, which is described below, is reached.

A comparison of requested content and the established rules is made, as shown in step 418. A decision is made, as shown in step 420, whether the requested content violates the established rules. For example, if a user has requested music with a parental warning, which is not allowed by the established rules, that content would be deemed to violate the established rules and would be unacceptable.

If the requested content is deemed acceptable in step 420, the requested content is provided to the client device, as shown in step 424. Furthermore, the acceptable requested content can be accumulated. This list of accumulated content can be published so that other users may view what content a particular user is accessing. This may be used as a social media, or recommendation to users who may have similar tastes. A listing of what content a user has been viewing or listening may be published to other users who are authorized to view such information.

Also, ratings agencies may track what content is not only being requested but what content is authorized, thereby obtaining a user profile with respect to what content is requested by a user and what content is permitted for the user. This may be achieved without the user requiring any additional hardware.

Additionally, this accumulated acceptable content may be used to generate advertisements, as shown in step 448. These advertisements may be provided to the user, as shown in step 448 leading to step 412.

Also, an indication of content that a user is accessing may be provided to a monitoring device, as shown in step 426. The monitoring device, which is typically a device capable of receiving an indication of what content is being provided to a client device may receive an indication that the content is being provided to the associated client device. The indication to the monitoring device depends on the available functionality of the monitoring device. For example, if the monitoring device does not have a display screen, the indication could be an audible tone. When the monitoring device is a device with a display screen, such as a smart phone, or television set, the indication could be an image, such as a screen shot of the content or a picture-in-picture display.

When the requested content is not acceptable, as shown in step 420, an indication may be provided to the monitoring device that the user of the client device has attempted to access unauthorized or unpermitted content. The content will not be provided to the client device and the monitoring device will receive an indication, as shown in step 438.

Additionally, intercept content may be provided to the client device. For example, intercept content may be any content that is deemed suitable, such as "G" rated content, such as "The Wiggles" or "The Muppets". This intercept content may be provided to the client device instead of the requested content.

The process ends as shown by end step 450 being reached.

As stated previously, various subroutines may also be accessed when requested content is identified.

Figure 4B:
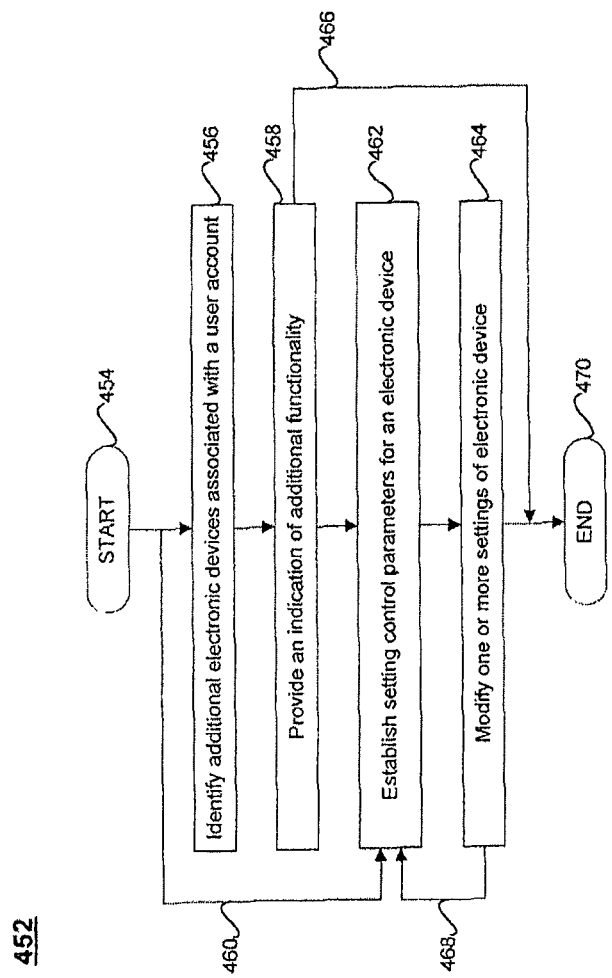

As shown in FIG. 4B, subroutine 452 is a series of steps that are typically stored on an electronic storage medium and executed by a processor. The subroutine 452 begins, as shown by step 454.

Additional electronic devices that are associated with a user account are identified, as shown in step 456.

An indication of additional functionality is provided to the user at the client device and the indication of additional functionality may also be provided to the monitoring device (s), as shown in step 458.

The monitoring device(s) may also establish control parameters for an electronic device, as shown in step 462. These control parameters may include, for example, volume setting, contrast, favorite channel settings and other device setting that can be adjusted. Thus, the user, when logging onto the client device, will have the settings they desire based on the established control parameters, as shown in step 462. There is also the ability to link devices together so that a listening device can duplicate changes made on a client device that is being monitored, or listened to. Such changes as volume settings, input source or other setting may be made. For example, an electronic device, such as a radio, can be set up as a registered listener for the receiver in a different room, such as a living room. When the receiver in the living room is tuned to a different radio station, the radio is notified and may be set to also tune to the new station when it receives the notification. Additionally, if the receiver, such as in the living room, has its volume, or other changeable parameter, modified by, for example, 10%, the volume (or corresponding parameter) of the radio (i.e. the listening device) likewise is modified by 10%. Users may also have control over what types of events and level of detail is included for each listener. The user may register multiple listening devices, each listening device with its own settings for what to send to that listener.

The electronic device may send event notices to each listening device over a predefined protocol. The protocol should provide for differing levels of information to be included, based on the settings that the user set and what information is available for the particular type of electronic device that generated the notification.

The transport used for sending these messages between electronic device and monitoring device(s) may be a suitable protocol such as an HTTP request sent by the electronic device. Examples of events and information that may be included in notification messages sent from an electronic device to a listening device include: power "on"/"off"; TV channel tuned to (for devices with TV tuners); the band and frequency tuned to (for devices with radio tuners) (e.g. FM 89.5); the input source; the volume setting; meta data about the source being viewed, such as program title and running time; the format of the source 1080i, 720p, 480p; the file format (container) of the source; video encoding used; audio encoding used; and optional parameters entered by the user when setting up the listening device. This may include, for example, a user ID when registering with a ratings service. This may assist the listener identify things such as the channel line for the signal the electronic device is attached to.

Events may be triggered when a value for a particular piece of information, or parameter, changes and the listening device tracks that information, or parameter. Additionally, more extensive and detailed information should be sent in an embodiment in which the listening device is being used for diagnostic purposes, such as when a user calls customer support and registers the customer support agent's computer, or server, as a listening device, or the user runs a trouble shooting application that they register as a listening device.

Another embodiment of the present invention is that a registered listener may reply to the electronic device of a customer that no further notifications of a particular type are necessary. This ensures that a listener device will not receive notifications that a user did not intend to be transmitted when the user authorized the listening device to receive notifications.

Furthermore, the settings may be modified, as shown in step 464. Line 468 shows that the modified settings may be incorporated into the established settings of step 462.

Alternatively, steps 456 and 458 may be skipped and step 462 reached directly, as shown by line 460 leading to step 462.

Alternatively, steps 462 and 464 may be skipped as shown by line 466 leading to end step 470.

The subroutine 452 ends as shown by end step 470.

FIG. 5 shows an embodiment of the present invention that monitors activity of a module of an electronic device. The steps 500 may be stored on a suitable electronic storage medium, such as a non-transitory computer-readable storage medium. For example, ROM, RAM, EEPROM. The storage medium may be resident on the device (local) or accessed from a remote device (remote). The steps are typically executed by a processor having adequate speed and processing capabilities.

The process begins, as shown by start step 502. A client device is associated with one or more modules, as shown in step 504.

Activity parameters are established for each of the modules, as shown in step 506. These activity parameters may be actions that the module is taking, such as program code being executed by the particular module, diagnostics being performed by the module or other action.

An identification of actuation of an activity parameter is performed, as shown in step 507.

An accumulation of identified actuations is generated, as shown in step 508.

The generated accumulation of identified actuations may be provided to a user using a protocol, such as RSS (Rich Site Summary), or other suitable protocol or feed, as shown in step 510.

The accumulation of identified actuations may be published (512), transmitted (514) and/or stored (516). The stored accumulations may be used to generate a manifest, or listing of accumulations, as shown in step 520. The step of generating a manifest, or listing, (520) may also be reached via line 518 from the generation of accumulated identified actuations (508). The manifest may be used by a user to audit or track the amount of time they spend viewing or listening to content. The manifest can also be organized to show types of content accessed, time of day content was accessed, fees, or charges for content accessed. Additionally, parents can retrieve a manifest of content accessed by their children. This can be used to monitor what the children were watching or listening to when the parents may not have been monitoring the children's electronic device. The total amount of viewing and listening time may be tracked so parents can limit the amount of time their children are accessing media content.

Alternatively, the module may be integrated into an automation system, as shown in step 526, which is reached from step 508, as shown by line 524. The automation system may be a home security system, lighting system, heating system, air conditioning system or other electronic-based system. The event messages may be monitored so as to control additional modules/devices of the automation system, as shown in step 528.

The process 500 ends as shown by end step 530.

Figure 6:
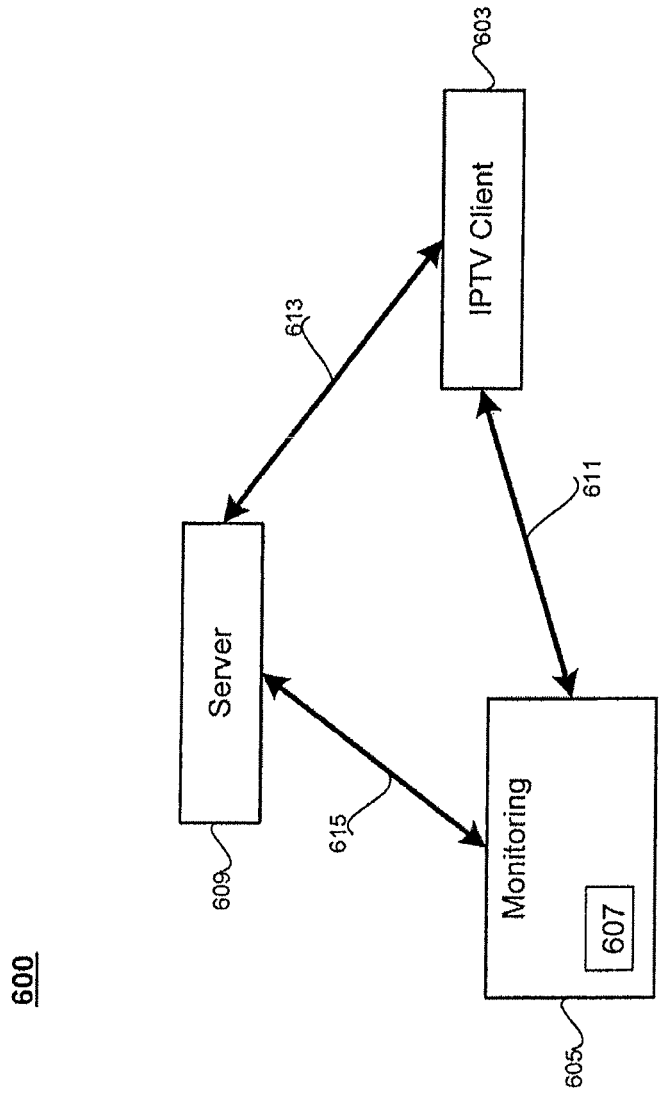
FIG. 6 shows a block diagram of modules according to an embodiment of the present invention.

FIG. 6 shows a block diagram 600 of modules according to an embodiment of the present invention. As shown in FIG. 6, monitoring device 605 is operatively coupled to IPTV client device 603, via bi-directional communication link 611, and server 609, via bi-directional link, 615. The monitoring device 605 has a picture-in-picture area 607 that may be used to display content requested by IPTV client module 603. The IPTV client device 603 is coupled to server 609 via bidirectional interconnection 613.

In one embodiment, monitoring device 605 is an IPTYV television device located in a living room while client device 603, which is also an IPTV device, is located in a family room. The parents in the living room can use monitoring device 605 to view what the children are watching in the family room on device 603. In the event the children attempt to access unauthorized content, the monitoring device 605 will provide an alert on device 605. Moreover, the monitoring device can show when a user of device 603 changes a channel or makes some other modification.

Indeed, the present invention provides for intercept content to be displayed on client device 603 when a user of client device 603 attempts to access unauthorized or impermissible content. The intercept content may be pre-selected permissible content that is substituted for the impermissible content. Program code operating the client device 603 will automatically default to the intercept content when impermissible content is requested for client device 603. The rules for permissible content may be stored at server 609.

Alternatively, the alert could cause the IPTV client device 603 to power off or otherwise show a blank screen that prevents the non-permitted content from being accessed by the IPTV client device 603.

Alternatively, the intercept content may be stored locally on IPTV client 603 and/or monitoring device 605. Thus, use of the server 609 is optional.

The server 609 may also track what content is requested by devices 603 and 605 and may use that information to generate a user profile. This user profile may be used to select advertisement data that is provided to IPTV devices 603, 605.

The server 609 may also track other devices associated with a user and provide information regarding how the user may enhance their viewing experience by using other devices associated with that user account. For example, a user may have BLU-RAY™ and PS3™ devices. Some content may be more readily viewed on the BLU-RAY™ player. The server 609 could send a notification to the user to suggest using the BLU-RAY™ player to display the particular content.

Figure 7:
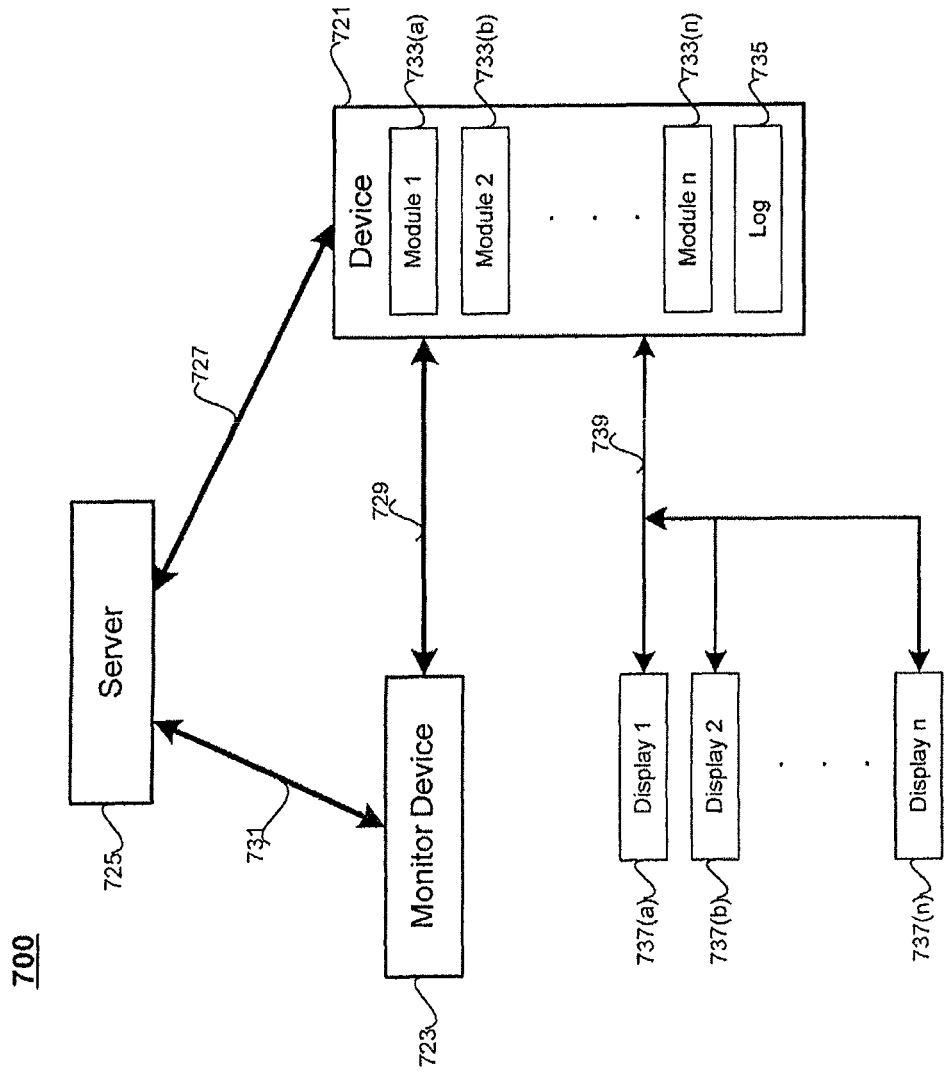
FIG. 7 shows a block diagram of modules according to another embodiment of the present invention.

FIG. 7 shows a block diagram 700 of modules according to an embodiment of the present invention. As shown in FIG. 7, monitoring device 723 is operatively coupled to electronic device 721, via bi-directional communication link 729, and server 725, via bi-directional link, 731. The electronic device 721 is coupled to server 725 via bidirectional interconnection 727.

The electronic device 721 includes a plurality of activity modules 733(*a*) . . . (*n*) (where "n" is any suitable number). The electronic device 721 also includes a log module 735 and the electronic device 721 is operatively couple to one or more display modules 737(*a*) . . . (*n*) (where "n" is any suitable number). The electronic device 721 is typically an IPTV device. Activity modules (generally 733) are processing modules within client device 721.

The log module 735, which is operatively coupled to modules 733, keeps track of the actions of activity modules 733. Each piece of code running on activity modules 733 of electronic device 721 may publish its activities through a standard feed, such as an RSS feed. Each published message may indicate the code module, the priority and any relevant data values. The type of data logged, or accumulated, or tracked, may be controlled by modifying the log settings of the log module 735. This may include a period of time the events or activities are logged, the type of activities that are logged or the relative importance of the activity. Thus, according to embodiments of the present invention, the log module 735 can monitor each activity module 733 on electronic device 721. The electronic device 721 may publish information on its activity using a protocol, such as a standard protocol.

Furthermore, the client device 721 may be integrated into other systems, such as a home automation system. This may be achieved by having the client device 721 publish a feed, such as an RSS feed, through a network connection 727/729 with user configured event messages that can be monitored to control other devices. For example, monitor device 723 and server 725 maybe operatively coupled to alarm systems, air conditioning systems, heating systems, lighting etc. to control the settings of those systems.

Display modules (generally 737) are operatively coupled to electronic device 721 and are used to provide a user interface for the user, display data and/or provide audio data to a user. The display modules 737 may be plasma devices, or other suitable device used to provide output to a user. The display modules 737 typically have display screens on which various conglomerations of the activities occurring on each module 733 or device 721 may be displayed. The display screens are typically data driven and updated by modifying a text file defining what is displayed on each screen of display module 737.

Additionally, the log module 735 can store, transmit and/or publish the accumulated data from activity modules 733. The accumulated data of the activity modules 733 may be provided to a server 725, which may be a customer service server.

Additionally, the server 725 is an optional component since the client module 721 may be operatively coupled directly to a desired peripheral module without using the server 725.

It will be appreciated from the above that the invention may be implemented as computer software, which may be supplied on a storage medium such as through a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for monitoring activity of a module of an electronic device comprising:
   associating an electronic device with one or more activity modules;
   establishing selectable activity parameters for activities of the activity module, including setting of priorities of the activity parameters;
   identifying actuation at the electronic device of one or more of the activity parameters of the activity module and the priorities of the activity parameters;
   displaying at least predetermined ones of the activity parameters that have been actuated, including time of actuation of the predetermined activity parameters and the priority of the displayed activity parameters;
   generating an accumulation of identified actuations and the priorities of the activity parameters that have been actuated; and
   providing the accumulation of identified actuations utilizing a pre-selected protocol.

2. The method as claimed in claim 1, further comprising:
   displaying various permutations of the accumulation of identified actuations.

3. The method as claimed in claim 1, further comprising:
   publishing accumulation of identified actuations for each activity module of an electronic device.

4. The method as claimed in claim 1, further comprising:
   logging the accumulation of identified actuations,
   wherein the logging is based on code module, event or priority.

5. The method as claimed in claim 4, further comprising:
   sending a notification of the accumulation to one or more of the electronic devices.

6. The method as claimed in claim 4, further comprising:
   modifying the logging step utilizing settings.

7. The method as claimed in claim 4, wherein the logging further comprises:
   logging an event for a period of time, based on the code module, event or priority.

8. The method as claimed in claim 1, further comprising:
   integrating the activity module with an automation system.

9. The method as claimed in claim 8, wherein an electronic device, being operatively coupled to one or more activity modules, publishes a feed through a network connection with an event message, and
   monitoring the event message to control additional modules or electronic devices.

10. The method as claimed in claim 9, wherein the feed includes an RSS feed.

* * * * *